Figure 4:
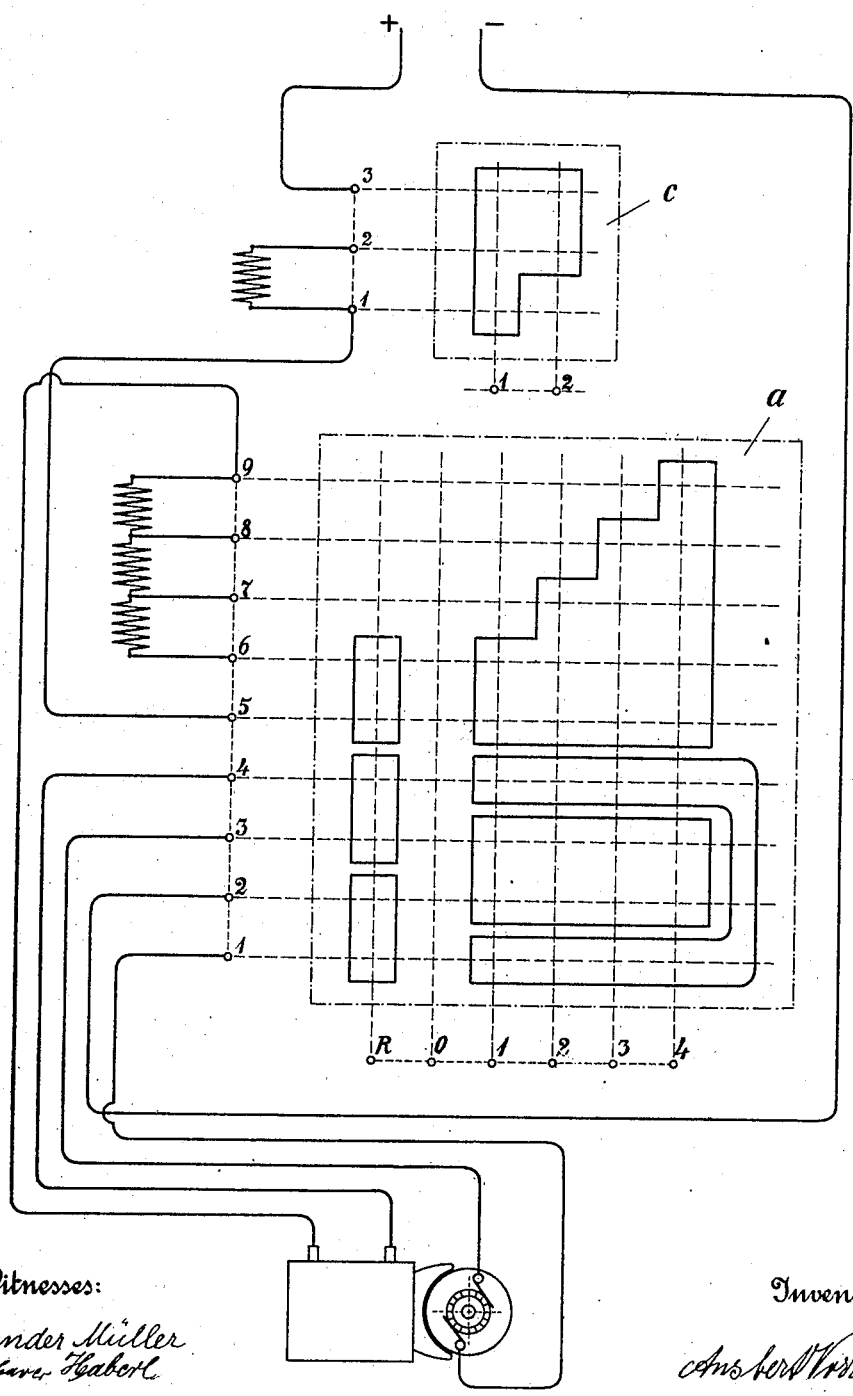

A. VORREITER.
CONTROLLER FOR ELECTRICALLY DRIVEN AUTOMOBILES.
APPLICATION FILED APR. 23, 1907.
918,402.
Patented Apr. 13, 1909.
2 SHEETS—SHEET 1.
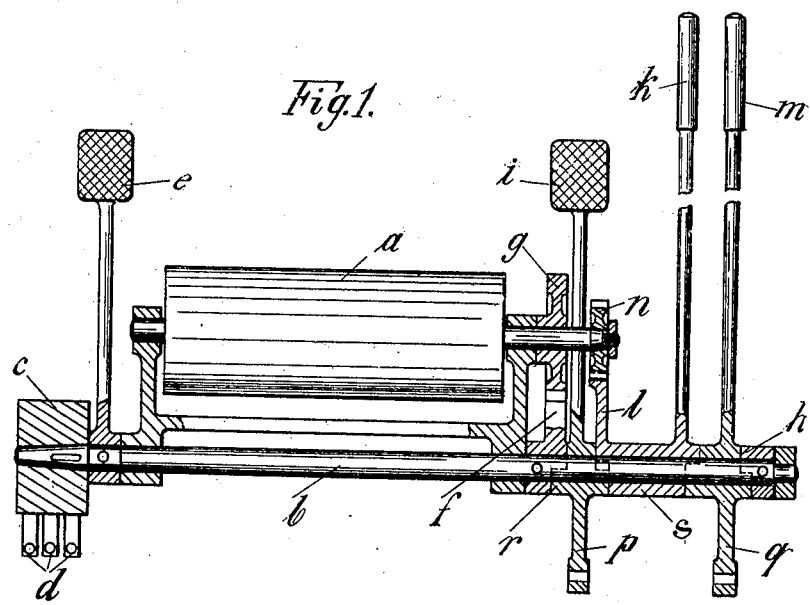
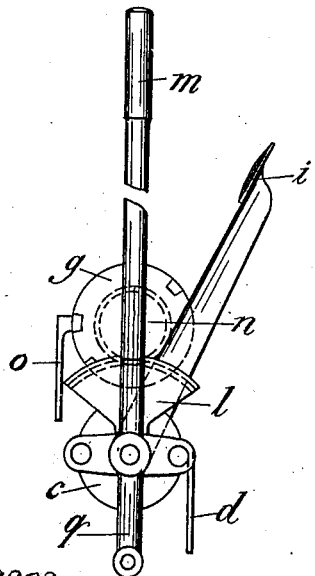
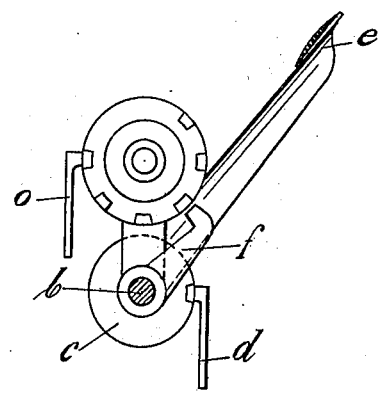

A. VORREITER.
CONTROLLER FOR ELECTRICALLY DRIVEN AUTOMOBILES.
APPLICATION FILED APR. 23, 1907.

918,402.

Patented Apr. 13, 1909.
2 SHEETS—SHEET 2.

UNITED STATES PATENT OFFICE.

ANSBERT VORREITER, OF BERLIN, GERMANY.

CONTROLLER FOR ELECTRICALLY-DRIVEN AUTOMOBILES.

No. 918,402.      Specification of Letters Patent.     Patented April 13, 1909.

Application filed April 23, 1907. Serial No. 369,726.

*To all whom it may concern:*

Be it known that I, ANSBERT VORREITER, chief engineer, a subject of the King of Prussia, residing at 121 Chausseestrasse, in the city of Berlin, Kingdom of Prussia, German Empire, have invented new and useful Improvements in Controllers for Electrically-Driven Automobiles, of which the following is a specification.

The present invention refers to a controller for electric motor-vehicles and consists of a switch-arrangement, in which a pedal serves to switch off the current and another pedal to put on the brake and simultaneously switch off the current. These pedals are coupled in such a manner with the switches of the controller drum, that it is only possible to put on another speed after one of the two pedals has been pressed down, similar as in the known arrangement on motor vehicles.

A further feature of the invention consists in the fact, that the pedal operating the brake and a lever operating a second brake will return the controller-drum to the first speed, when the brake is put on, so that when the brake is released the vehicle will not start at full speed. By pressing down the one pedal, rigidly attached to a shaft a switching off drum is moved and simultaneously a pawl is disengaged from a ratchet disk, so that only now the lever for varying the speed can be operated. In a similar manner the pawl is disengaged from the ratchet disk when the other brake-pedal fitted loose on the said shaft or the brake-lever is operated, so that the switching drum is returned by means of a gear-wheel and gear-segment into the position for the first speed. The pawl which is rigidly arranged on the shaft and also the gear-segment having a sleeve moving loose on the shaft, are moved by suitably provided dogs.

The purpose of the present design is to firstly afford an operation of electric automobiles similar to that customary on combustion engine automobiles run with gasolene so that a driver accustomed to a gasolene motor car can instantly also handle an electric car fitted with a switching gear according to the present invention.

The second purpose of the invention is to avoid sparking on the switching drum when it is turned to another speed, by the drum being released only after the current has been switched off by the respective pedal.

Thirdly the present invention allows of the vehicle starting at once at the first speed when the brakes are loosened, without any lever having to be previously moved.

In the accompanying drawing a mode of carrying out the present invention is exemplified Figure 1 being a vertical longitudinal section through the axis of the switch-levers; Fig. 2 is a side elevation of the arrangement of the switch-levers; Fig. 3 is a side elevation of the locking-gear. Fig. 4 is a diagrammatic view showing the various positions of the main drum and the cut-off switch with the working circuits.

The switching-drum —a— is revolubly arranged in a frame which carries also the shaft —b—. On the said shaft —b— the switching-off drum —c— is rigidly fitted, receiving the current through the contact-fingers —d—. Rigidly attached to shaft —b— are the lever —e— and its pawl —f—, which holds by means of ratchet-disk —g— the switching-drum —a— in position, and a dog-collar —h—. Loose on the shaft are the brake-lever —i—, the switch-lever —k— with the gear-segment —l— and the brake-lever —m—. The gear-segment —l— engages with a gear-wheel —n— rigidly fitted on the shaft of the switching drum —a—, so that on lever —k— being operated the drum —a— is turned. By fingers —o— (Fig. 3) current is supplied to drum —a—. By means of pedal —i— and the thereto coupled lever —p— as also by the hand-lever—m— and the thereto coupled lever —q— the brake-gear can be operated. The hubs of levers —k—, —m—, and pedal —i— are coupled by dogs —r— together and with the pawl —f— and the dog-collar —h—, so that when the pedal —i— is pressed down or the brake-lever —m— is operated the pawl —f— rigidly fitted to shaft —b— is disengaged from the ratchet disk —g— and the lever—k— having sleeve —s— and turning on shaft —b— is turned together with the gear-segment —l—, fitted on sleeve —s—, gear-wheel —n— and switching drum —a—. The dogs on the hub of sleeve —s— correspond with the dogs on the hubs of lever —m— and the pedal —i— in such a manner that on the pedal —i— being pressed down, or the lever —m— being operated respectively, the contact-drum —a— will always be returned into the position of first speed, whatever position it may have had before.

The device operates as follows: When pedal —e— is pressed down the switch —c— rigidly fitted to shaft —b— is turned, and the pawl —f— rigidly attached to shaft —b— is disengaged from the disk —g—, so that now the switch-lever —k— can be reversed into the position of first speed. The pedal can then be returned by a spring into its initial position when the foot is withdrawn. If now a greater speed is to be put on, lever —e— must be again pressed down and the gear-segment —l— rigidly fitted to the same sleeve —s— must be turned by means of lever —k— until the segment —l— has turned the gear-wheel —n— and therewith the drum —a— into the desired position. All four speeds from 1 to 4 or the backward motion can be subsequently turned on. The drum —a— can thus be only turned to another speed, after the lever —e— has been pressed down, so that no sparking can occur on the plates of the drum. Sparking can only occur at the switch —c— the drum of which is easily exchanged, as it is fitted on the end of shaft —b—. Should the vehicle have to be suddenly slowed down or stopped the pedal —i— must be pressed down or the brake-lever —m— be operated, whereby the lever —p— coupled with pedal —i— or the lever —q— coupled with brake-lever —m— operates a brake-gear. At the same time either pedal —i— and dogs —r— or lever —m— and the dogs of the collar —h— will disengage the pawl —f— rigid on the shaft from the ratchet disk —g— and by turning the sleeve —s—, loose on shaft —b— move the thereto connected segment-gear —l— and gear-wheel —n— so far, until the first speed is adjusted, so that the vehicle will start slowly on the brakes being released.

Having now described my invention what I claim and desire to secure by Letters Patent of the United States is:

1. The combination with a switching drum of a controller for electrically driven vehicles, of a ratchet disk attached to the shaft of said drum, a counter shaft $b$, a pawl rigidly fixed to said counter shaft $b$ and adapted to engage with the ratchet disk, a cut-off drum carried by said counter shaft, a hand lever $k$ mounted to turn on the counter shaft $b$ and connected by means of a gearing to the shaft of the switching drum, and a cut-off foot lever $e$ fixed to the counter shaft $b$, as and for the purpose described.

2. The combination with a switching drum of a controller for electrically driven vehicles, of a ratchet disk attached to the shaft of said drum, a counter shaft $b$, a pawl rigidly fixed to said counter shaft $b$ and adapted to engage with the ratchet disk, a cut-off drum carried by said counter shaft, a hand lever $k$ mounted to turn on the counter shaft $b$ and connected by means of a gearing to the shaft of the switching drum, a cut-off lever $e$ fixed to the counter shaft $b$, and a brake foot lever $i$ and a brake hand lever $m$ both parts mounted on the counter shaft $b$ and being coupled to the hub of the hand lever $k$ in such a manner that on depressing the foot lever $i$, or on operating the hand lever $k$, the counter shaft $b$ is turned so as to cut off the circuit and the switching drum is returned into the first speed position, as and for the purpose described.

In witness whereof I have hereunto signed my name this 25th day of March 1907, in the presence of two subscribing witnesses.

ANSBERT VORREITER.

Witnesses:
WOLDEMAR HAUPT,
OTTO JEBACHT.